(12) United States Patent
Evans et al.

(10) Patent No.: US 6,990,759 B2
(45) Date of Patent: Jan. 31, 2006

(54) MATERIAL HANDLING VEHICLE TRANSMISSION

(75) Inventors: Simon James Peter Evans, Shropshire (GB); David John Hoyle, Cheshire (GB); David Allan Wozencraft, Shropshire (GB)

(73) Assignee: JCB Transmissions, Wrexham (GB)

( * ) Notice: Subject to any disclaimer, the term of this patent is extended or adjusted under 35 U.S.C. 154(b) by 86 days.

(21) Appl. No.: 10/392,373

(22) Filed: Mar. 19, 2003

(65) Prior Publication Data

US 2003/0186768 A1    Oct. 2, 2003

(30) Foreign Application Priority Data

Mar. 28, 2002  (GB)  .................................... 0207291

(51) Int. Cl.
*E02F 3/32* (2006.01)
(52) U.S. Cl. .................... 37/443; 37/466; 192/3.29
(58) Field of Classification Search .............. 37/348, 37/443, 466; 477/62, 65; 192/3.29; 414/694
See application file for complete search history.

(56) References Cited

U.S. PATENT DOCUMENTS

| | | | |
|---|---|---|---|
| 3,252,352 A | | 5/1966 | General et al. |
| 4,360,090 A | | 11/1982 | Wonn |
| 4,431,095 A | * | 2/1984 | Suga ........................... 192/3.31 |
| 4,476,970 A | * | 10/1984 | Ito ............................... 477/63 |
| 4,664,235 A | * | 5/1987 | Yokoyama et al. ......... 192/3.29 |
| 4,768,632 A | * | 9/1988 | Moan .......................... 192/3.3 |
| 5,145,045 A | * | 9/1992 | Wakahara ................... 192/3.29 |
| 5,325,946 A | * | 7/1994 | Kashiwabara et al. ..... 192/3.31 |
| 5,343,990 A | * | 9/1994 | Iizuka ........................ 192/3.31 |
| 5,598,907 A | * | 2/1997 | Yamaura .................... 192/3.29 |
| 5,669,475 A | * | 9/1997 | Matsuoka ................... 192/3.29 |
| 5,720,358 A | | 2/1998 | Christensen et al. |
| 5,727,921 A | * | 3/1998 | Brown ........................ 414/694 |
| 5,799,260 A | * | 8/1998 | Droste et al. ................. 701/51 |
| 5,802,490 A | * | 9/1998 | Droste ......................... 701/51 |
| 6,079,529 A | | 6/2000 | Hinkel et al. |
| 2002/0011392 A1 | | 1/2002 | Tsuchiya et al. |

FOREIGN PATENT DOCUMENTS

| | | |
|---|---|---|
| EP | 1329648 | 7/2003 |
| GB | 2010450 | 6/1979 |
| GB | 2367102 | 3/2002 |

* cited by examiner

*Primary Examiner*—Victor Batson
(74) *Attorney, Agent, or Firm*—Egbert Law Offices (57) ABSTRACT

A vehicle of the type described wherein the torque converter has an input shaft adapted to be driven by the engine and connected to an impeller and an output shaft adapted to drive the ground engaging device and connected to a turbine, torque being transmitted between the impeller and the turbine hydro-kinetically by fluid and a reactor member in the fluid path and there being a lock up clutch which, when in an operative condition, connects the torque converter for direct drive without torque conversion between the input shaft and the output shaft and which, when in an inoperative condition, permits drive through the torque converter with torque conversion.

8 Claims, 8 Drawing Sheets

MATERIAL HANDLING VEHICLE TRANSMISSION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention relates to a material handling vehicle, hereinafter referred to as a vehicle of the type described, comprising a body supported on ground engageable means driven from an engine mounted on the body by a transmission which includes a torque converter and a change speed gearbox and wherein the body has a boom carried thereon for at least up and down pivotal movement about an axis which is transverse to the body and the boom carrying a material handling implement.

BACKGROUND OF THE INVENTION

A vehicle of the type described may be of the kind generally known as a back hoe excavator in which the boom comprises a main boom, which at its lower end is pivotally connected to a king post assembly for movement up and down in a vertical plane, a dipper arm, pivotally connected at the outer end of the main boom for movement in a vertical plane, said dipper arm carrying, or being adapted to carry a material handling implement such as a bucket, hydraulic rams to pivot the main boom relative to the king post for raising and lowering the main boom in the vertical plane, to pivot the dipper arm in a vertical plane relative to the main boom and to pivot the implement tool in a vertical plane relative to the dipper arm, the king post assembly being capable of pivotal movement about a vertical axis so that the main boom can be rotated or stewed from one side to the other of the center line of the tractor or other vehicle for the purpose of working to one side or the other of the vehicle. The king post assembly may be mounted upon a frame extending transversely of the center line of the tractor or like vehicle, the king post assembly being slidable or adjustable along this frame so that it can be positioned at one extreme side of the frame for the purpose of working in a direction parallel to the center line of the vehicle, such as when digging a trench or excavating, or clearing a ditch, where it is not possible to work along the center line of the tractor.

Alternatively or in addition a vehicle of the type described may be provided with a boom comprising a loader arm assembly, one end of the loader arm assembly being mounted on a support part of the body for rotation about a first horizontal axis and the loader arm assembly carrying at its other end, a material handling implement adapted for rotation about a second horizontal axis, fluid operated means being provided to rotate the loader arm assembly about the first horizontal axis and fluid operated means being provided to cause rotation of the implement relative to the loader arm assembly about the second horizontal axis. The loader arm assembly may comprise a single boom or a pair of spaced booms.

Alternatively a vehicle of the kind described may comprise a telescopic handler in which the boom comprises a plurality of boom sections which are movable longitudinally relative to each other so that the boom may be extended and in which one end of the boom is pivotally mounted on the body towards the rear of the body for up and down pivotal movement and the opposite end of the boom carrying a material handling implement.

In the past such vehicles had a transmission incorporating, for example, a four speed gearbox but with a desired increase in road speed the spacing of the gear ratios in such a gearbox became sufficiently large for the vehicle to have poor driveability. In an attempt to overcome this problem gearboxes with a larger number of ratios have been used such as five and six speed gearboxes so as give smaller steps between the gears and thus improve the driveability.

However, at higher road speeds, and because a soft torque converter match is needed on a vehicle of the kind described such a vehicle loses speed quite noticeably when called upon to climb a hill. In addition the higher road speed even on the flat also creates more drag on the vehicle. In either case there is consequently greater converter slip and therefore more heat is dissipated.

The power range of the engine may lie in the range 50 HP to 150 HP.

An object of the invention is to provide a vehicle of the type described in which the above mentioned problem is overcome or is reduced.

BRIEF SUMMARY OF THE INVENTION

According to the present invention, a vehicle of the type described is provided wherein the torque converter has an input shaft adapted to be driven by the engine and connected to an impeller and an output shaft adapted to drive the ground engaging means and connected to a turbine, torque being transmitted between the impeller and the turbine hydro-kinetically by fluid and there being a reactor member in the fluid path and there being a lock up clutch which, when in an operative condition, connects the torque converter for direct drive without torque conversion between the input shaft and the output shaft and which, when in an inoperative condition, permits of drive through the torque converter with torque conversion.

The reactor member may be held against rotation under torque conversion conditions by an overrun device.

There may be a fluid circuit whereby fluid enters the torque converter by an inlet conduit and leaves the torque converter by an exit conduit during normal operation of the device and in which operation of the lock up clutch to an operative condition is caused by reversal of flow of fluid so that said fluid leaves the torque converter via the inlet conduit and enters the torque converter via the exit conduit.

The fluid flow in said circuit may be controlled by a valve which in a first condition feeds fluid from said supply to said inlet conduit and in a second condition feeds fluid from said supply to said exit conduit.

The valve may have a valve member which is moveable in one direction between said first and second positions by a solenoid.

The solenoid may be energized under the control of an electrical switch operated by the driver, or by an automotive control unit.

The vehicle may be a back hoe excavator in which the boom comprises a main boom, which at its lower end is pivotally connected to a king post assembly for movement up and down in a vertical plane, a dipper arm, pivotally connected at the outer end of the main boom for movement in a vertical plane, said dipper arm carrying, or being adapted to carry a material handling implement such as a bucket, hydraulic rams to pivot the main boom relative to the king post for raising and lowering the main boom in the vertical plane, to pivot the dipper arm in a vertical plane relative to the main boom and to pivot the implement tool in a vertical plane relative to the dipper arm, the king post assembly being capable of pivotal movement about a vertical axis so that the main boom can be rotated or slewed from one side to the other of the center line of the tractor or other vehicle for the purpose of working to one side or the other of the vehicle. The king post assembly may be mounted upon a frame extending transversely of the center line of the tractor or like vehicle, the king post assembly being slidable or adjustable along this frame so that it can be positioned at one extreme side of the frame for the purpose of working in a direction parallel to the center line of the vehicle, such as when digging a trench or excavating, or clearing a ditch, where it is not possible to work along the center line of the tractor.

Alternatively or in addition the vehicle may have a boom comprising a loader arm assembly, one end of the loader arm assembly being mounted on a support part of the body for rotation about a first horizontal axis and the loader arm assembly carrying at its other end, a material handling implement adapted for rotation about a second horizontal axis, fluid operated means being provided to rotate the loader arm assembly about the first horizontal axis and fluid operated means being provided to cause rotation of the implement relative to the loader arm assembly about the second horizontal axis. The loader arm assembly may comprise a single boom or a pair of spaced booms.

Alternatively the vehicle may be a telescopic handler in which the boom comprises a plurality of boom sections which are movable longitudinally relative to each other so that the boom may be extended and in which one end of the boom is pivotally mounted on the body towards the rear of the body for up and down pivotal movement and the opposite end of the boom carrying a material handling implement.

BRIEF DESCRIPTION OF THE SEVERAL VIEWS OF THE DRAWINGS

The invention will now be described in more detail by way of example with reference to the accompanying drawings.

DETAILED DESCRIPTION OF THE INVENTION

Figure 1:
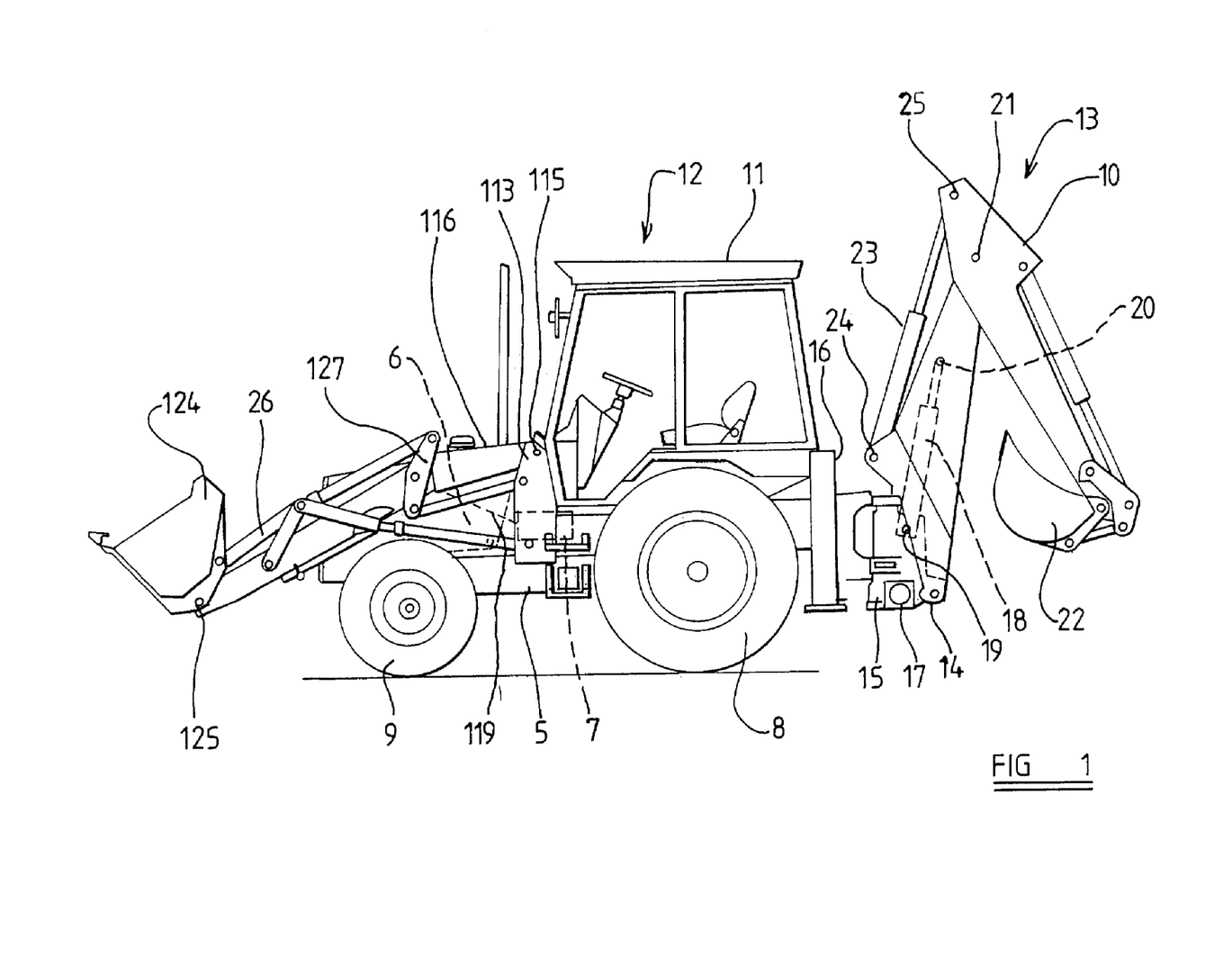
FIG. 1 is a side elevation of a back hoe excavator embodying the invention.

Referring now to FIG. 1, a vehicle 12 of the kind generally known as a back hoe excavator is illustrated at 11 and comprises a body 5 carrying an engine 6 an output of which is connected by a transmission 7, hereinafter to be described, to rear ground engageable wheels 8. If desired, the transmission 7 may alternatively or in addition connect the engine output to the front wheels 9. Mounted on the body 5 is a boom 13 which is pivotally connected at its lower end for movement in a vertical plane by means of a pivot pin 14, to the bottom of the king post assembly 15. The king post assembly 15 is mounted upon a frame 16 disposed to extend transversely across the rear of the vehicle 12. The king post assembly 15 is arranged to move transversely across the rear of the vehicle along the frame 16 and is also arranged to pivot about a vertical axis by means of an hydraulic ram 17 or other suitable means. A hydraulic ram 18 is pivotally connected between the upper end of the king post assembly 17, by means of a pivot pin 19, and a position in the upper end of the boom 13, by a pivot pin 20.

A dipper arm 10 is pivotally connected by a pivot pin 21 to the upper end of the boom 13 and the dipper arm 10 carries at its one end a material handling tool 22. At the other end of the dipper arm 10 a further hydraulic ram 23 is pivotally connected between the dipper arm 10, by means of a pivot pin 25, and the boom 13, by means of a pivot pin 24.

In operation, the king post 15 may be moved transversely across the rear of the vehicle 12 in order to enable the excavator to be used adjacent to walls or ditches or similar positions in which the excavator could not be operated if it were secured on the center line of the tractor due to the width of the tractor causing the excavator to be spaced from the wall or the like by half the width of the tractor. The boom 13 and the associated dipper arm 10 and the material handling implement 22 may be traversed by the vertical axis by means of the king post assembly 15 which is operated by the hydraulic ram 17. The boom 13 may be raised and lowered in the vertical plane about the pivot 14 which provides the pivotal connection thereof to the king post assembly 15 by means of the hydraulic ram 18. Similarly the dipper arm 10 may be raised and lowered in a vertical plane by pivoting about the pivot pin 21 and actuated by means of a hydraulic ram 23. If desired the dipper arm 10 may be a one piece member or may be a two part member which are arranged to telescope one within the other.

If desired the vehicle 10 may be provided with a lift arm assembly at the front thereof which comprises a pair of booms disposed on either sides of the front of the vehicle attached to a support part 113 for pivotal movement about a horizontal axis 115. The loader arm assembly comprises a pair of booms 116. The loader arm assembly may be raised and lowered about the horizontal axis 115 by a pair of hydraulic rams 119, one ram of the pair being operatively connected to each of the booms 16. A suitable material handling implement, in the present example, a bucket, illustrated at 124, is pivotally mounted for movement about an axis 125 by hydraulic rams 126 provided with a linkage 127 for maintaining the attitude of the bucket as the boom assembly is raised and lowered in conventional manner.

Referring now to FIGS. 2 to 5 of the drawings, a material-handling vehicle is indicated generally at 510 and comprises a main structure 511 having a front end 512 and a rear end 513 with a longitudinal axis X—X extending between the front and rear ends. The structure 511 comprises a pair of spaced parallel frame members 514, 515 held in spaced parallel relationship by cross members and including a rear torsion box 511a, a deck plate 511b and front torsion box 511c.

Each frame member 514, 515 has an upper surface 521, 522 respectively. At the front and rear the frame members 514, 515 have generally upright parts 524, 525 respectively whilst on their undersides they have a lower surface 526, 527 respectively. The right-hand frame member 515 has an upwardly relieved part 528 to provide clearance for an engine and transfer mechanism, as hereinafter to be described. A front axle 530 is mounted on the frame members 514, 515 at the front end thereof whilst a rear axle 531 is mounted to the frame members 515 towards the rear thereof.

The axles 530, 531 are of conventional type carrying at their opposite ends front wheels 533 and rear wheels 534 respectively. Both the front wheels 533 and both rear wheels 534 are pivotable relative to their associated axis about a vertical steering axis V for steering movement of the vehicle, as shown in chain dotted line in FIG. 4. If desired, at least one of the axles may be mounted relative to the frame members 514, 515 for oscillation about a longitudinally extending axis.

The front and rear wheels 533 and 544 are driven from the engine 6, hereinafter to be described, by the transmission 7 comprising inter alia a change speed gearbox 204 and a torque converter 200 and as hereinafter to be described.

Figure 4:
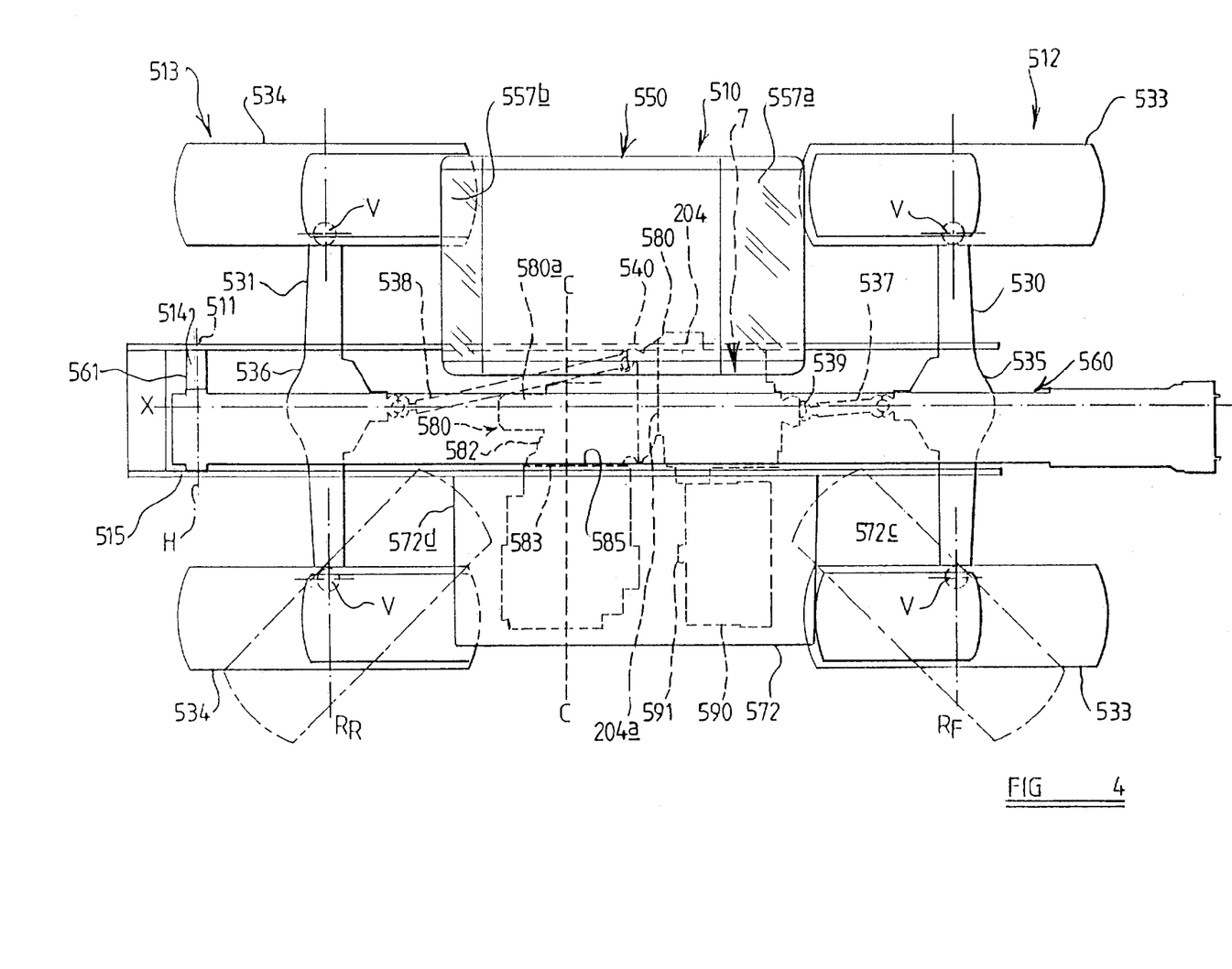
FIG. 4 is a plan view of the vehicle of FIG. 2.
Figure 5:
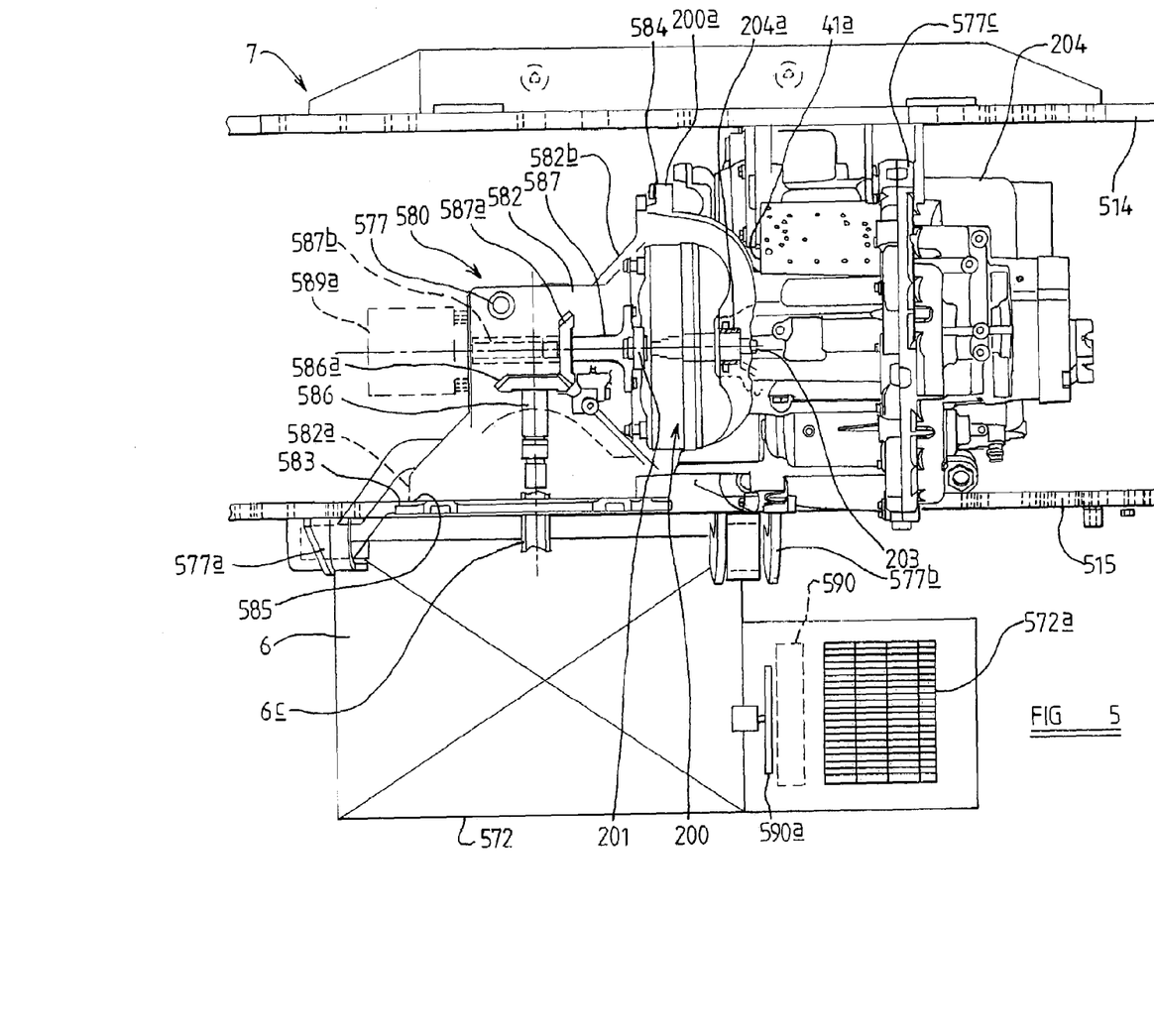
FIG. 5 shows a partial schematic view of FIG. 4 drawn to an enlarged scale.

Each axle 530, 531 is provided with a differential 535, 536 respectively of conventional form, the differentials being driven by propeller shafts 537, 538 respectively from front and rear output shafts 539, 540 respectively of a change speed gearbox 204 incorporating, by virtue of being attached thereto, a torque converter 200. The input and output shafts and change speed gear carrying shafts of the gearbox 204 extend parallel to the longitudinal axis X—X.

The change speed gearbox 204 is mounted on the frame members 514, 515 so as to be disposed therebetween and disposed so that the rear end face 204a of the gearbox is at a position approximately midway between transverse axes RF, RR respectively extending horizontally through the axes V and the center of propulsive rotation of each wheel 533, 534.

Figure 2:
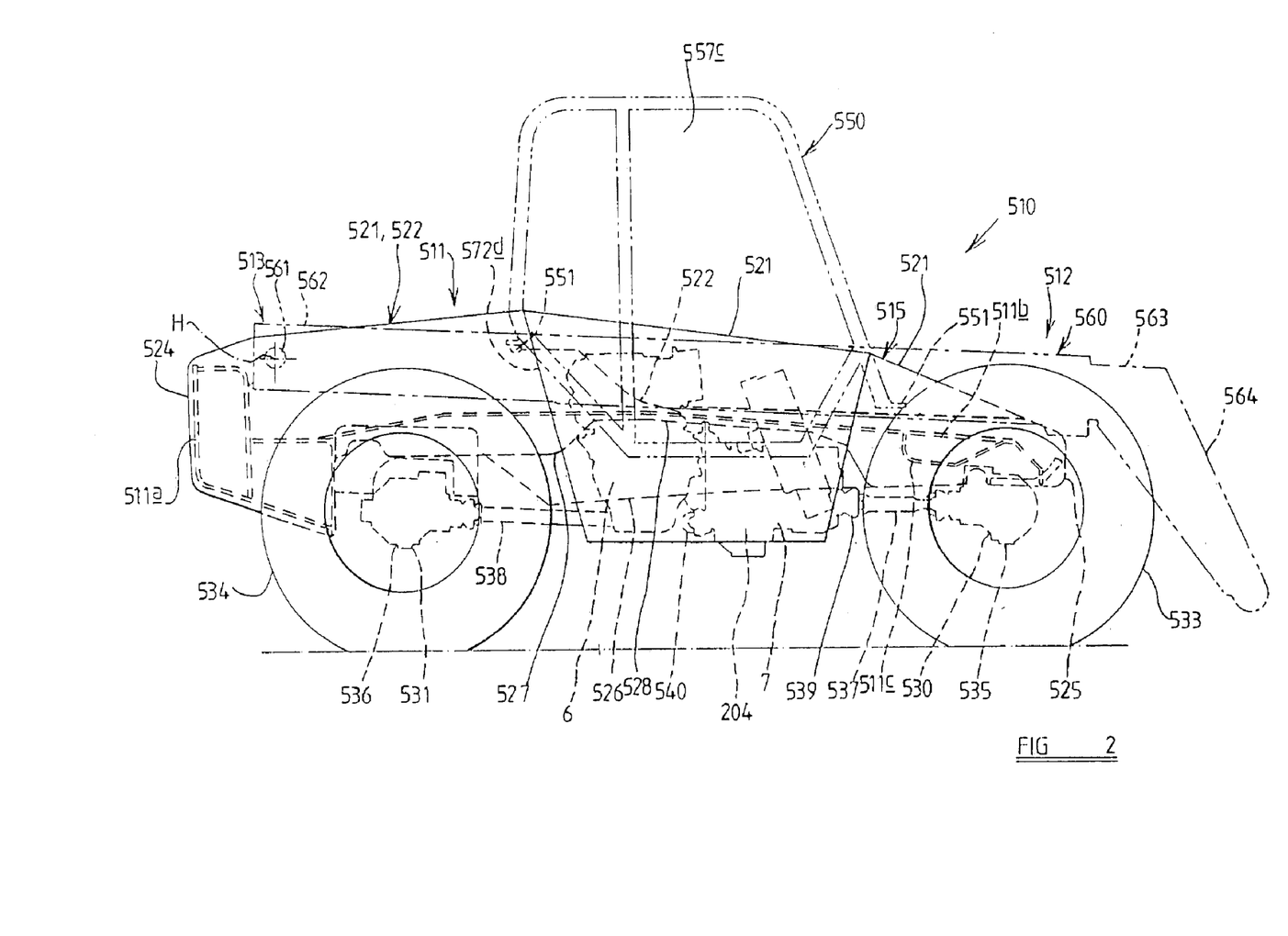
FIG. 2 is a side elevation of a telescopic handler embodying the invention.
Figure 3:
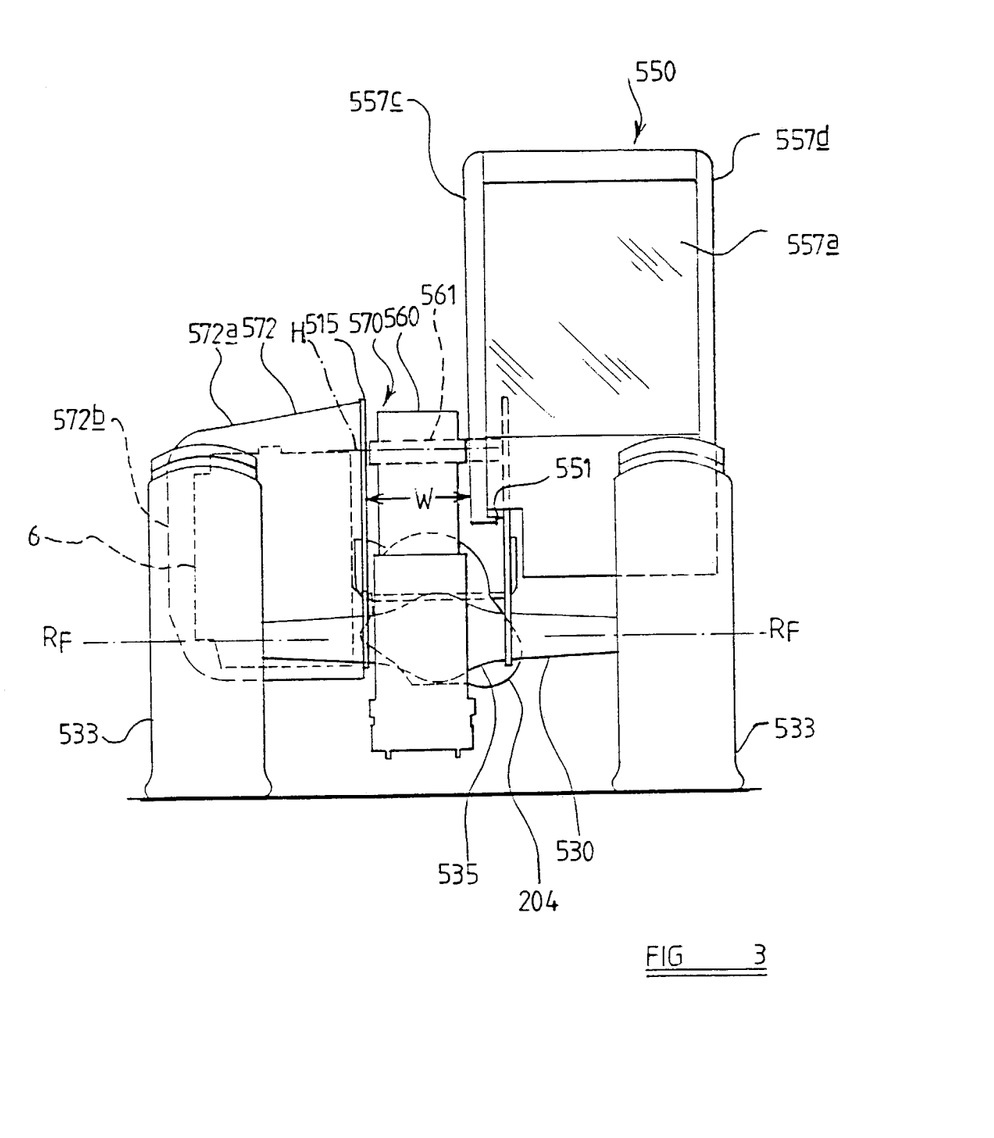
FIG. 3 is a front elevation of the machine of FIG. 2.

An operator's cab 550 is mounted on the frame member 514 by vibration isolating mounts 551 so that the cab 550 is supported on one side of the longitudinal axis X—X of the vehicle. The cab 550 has a front window 557a, a rear window 557b and two side windows 557c, 557d, the window 557c facing transversely across the machine. The or each window may be provided with a transparent closure element such as glass, or may be open, or may be provided with a protective element such as a grille or bars. A driver's seat, steering wheel and other controls, not shown, are provided in the cab and the cab is provided with an access door or opening on the side in which the window 557d is provided.

A loader arm 560 is pivotally mounted, by means of an axle member 561, between the frame members 514, 515 at the rear 513 of the vehicle for pivotal up and down swinging movement about a horizontal axis H. The loader arm 560 is telescopic and comprises a rear outer section 562 which is pivotally connected to the frame members 514 and 515 by the axle 561 and a forward inner member 563 which is telescopically slidable with the section 562 under the control of hydraulic rams in conventional manner. At its front end the part 563 is provided with a downwardly and forwardly extending part 564 adapted to carry a material handling implement such as a loader bucket or lifting forks or other desired material handling means. If desired the loader arm may have more than two telescopically slidable sections or may not be telescopic.

When the loader arm 560 is in its lowermost position, as shown in the figures, it lies in a well 570 of a minimum width W which is greater than the width of the loader arm and provided between the cab 550 and the frame member 515.

The internal combustion engine 6 is disposed on the opposite side of the frame member 515 to the well 570 and thus is disposed on the opposite side of the longitudinal axis X—X of the vehicle to the cab 550. The engine 6 is, in the present example, a four cylinder diesel engine having a crankshaft 6c rotatable about an axis C—C which is perpendicular to the longitudinal axis X—X. The engine 6 is mounted on the frame member 515 in any desired manner.

In the present example, the engine is disposed in a housing 572, the top 572a of which at one side extends generally transversely away from the frame member 515 at substantially the top thereof and is inclined downwardly, as best shown in FIG. 2. At the outer edge the housing 572 has a generally vertical side surface 572b and, at the front and rear, downwardly and rearwardly and downwardly and extending forwardly front and rear end faces. If desired, the housing may be of a different configuration than that described hereinbefore and may be wholly or partly omitted.

Disposed between the engine 6 and the gearbox 204 is a transfer mechanism 580 mounted in a transfer box 582 having a first extension part 582a having a first mounting face 583 bolted to the inwardly facing end face 585 of the engine 6 and a second extension part 582b having a second mounting face 584 bolted to a first torque converter housing part 200a which is fastened to the rearwardly facing end 41a of the gearbox 204. Rotatably mounted within the transfer box 582, as best shown in FIG. 5, is an input shaft 586 which is connected to the crankshaft 6c of the engine and an output shaft 587 which is connected to an input shaft 203 of the gearbox 204. The input and output shafts 586, 587 have bevel gears 586a, 587a respectively fixed relative thereto and which are interengaged to transmit torque between the engine and the gearbox therethrough. The output shaft 587 has an extension 587b which drives a hydraulic pump 589a bolted to the transfer box 582.

Although in this example the torque converter 200 is housed by virtue of the transfer box 582 having an integral extension part 582b which provides a second torque converter housing part and which co-operates with the first torque converter housing part 200a to provide a housing for the torque converter 200, if desired the torque converter housing part 582b may be separate from and bolted to the transfer box 582. Moreover, the torque converter may be housed in any other desired manner so as to be operatively disposed between the gearbox and the transfer mechanism or at another suitable disposition in the drive path such as between the engine and the transfer mechanism.

The engine, transfer box and gearbox are mounted to the frame 514, 515 by anti-vibration mounts 577a, 577b and 577c.

If desired, other forms of mechanical transfer means may be provided to transfer the drive between the engine and the gearbox.

Disposed in front of the engine within the housing 572 is a cooling radiator 590 through which coolant of the engine 6 is circulated through pipes, not shown, and the radiator 590 is provided with an hydraulically operated fan 590a, or, if desired, by an electrically or mechanically operated fan to cause flow of cooling air over the radiator, suitable ventilation openings 572a may be provided in the housing 572 for flow of such air. If desired the radiator may be positioned at another position on the vehicle, such as adjacent to the rear thereof.

Although in the above described example the engine is disposed wholly to the rear of a mid-point between the axes RF and RR and the gearbox substantially wholly to the front of such mid-point, if desired the engine may be positioned in any desired longitudinal position between the wheels and the gearbox may be positioned at a desired longitudinal position on the machine. If desired, the gearbox may be mounted to the rear of the engine.

The arm in its lowest position may be horizontal or may extend forwardly and downwardly.

Either of the vehicles described hereinbefore may be provided with a transmission to be described hereinbelow.

Figure 6:
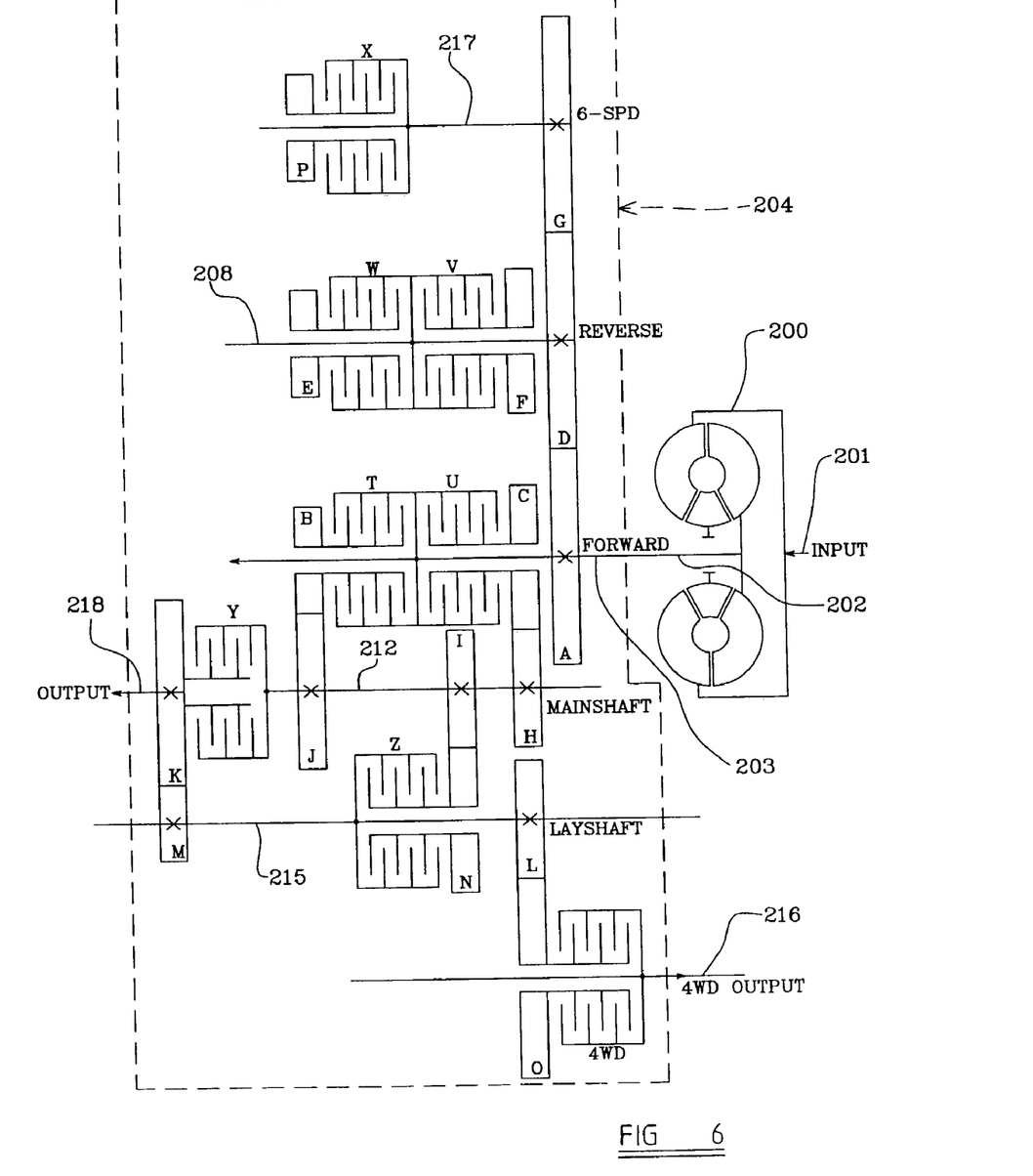
FIG. 6 is a diagrammatic illustration of a change speed gear box for use in a transmission which is provided in the vehicle of FIGS. 1 to 5.

Referring to FIGS. 5 and 6, transmission 7 comprises a torque converter 200 having an input 201 connected to the engine 6 and an output 202 which is connected to the input shaft 203 of the change speed gearbox 204.

The input shaft 203 has a gear A fixed to rotate therewith and which is in mesh with a reverse shaft drive gear D which drives a reverse drive shaft 208. The input shaft 203 can be connected in driving relationship with a first gear C or a second gear B by conventional multi-plate clutches U or T respectively. The gear C is in mesh with a gear H fixed to a main shaft 212. The main shaft 212 carries a gear I fixed to rotate therewith and which is in mesh with a gear N carried by a lay shaft 215 and connectable in driving relationship therewith by a conventional multi-plate clutch Z. The output 218 can be connected in driving relationship with layshaft 212 by clutch Y. The main shaft 212 also carries a conventional multi-plate clutch Y. The output shaft 218 carries a gear K fixed to rotate therewith, and which us in mesh with gear M.

| FORWARD RATIO | | Clutches Engaged | REVERSE RATIO | | Clutches Engaged |
| --- | --- | --- | --- | --- | --- |
| 1 | 8.17 | XZ | 1 | 6.45 | WZ |
| 2 | 4.90 | TZ | 2 | 4.76 | VZ |
| 3 | 3.622 | UZ | 3 | 1.78 | WY |
| 4 | 2.25 | XY | 4 | 1.31 | VY |
| 5 | 1.35 | TY | | | |
| 6 | 1.00 | UY | | | |

The lay shaft 215 has a gear L fixed thereto and which is in mesh lay gear O connectable to a four wheel drive output shaft 216 by a conventional multi-plate clutch 4WD.

The gear D fixed to the reverse shaft 208 besides being in mesh with the gear A is also in mesh with a gear G carried on a 6 speed shaft 217.

This shaft 217 carries a gear P which is connectable to rotate therewith by a conventional multi-plate clutch X and is in mesh with a gear J fixed to the main shaft 212. Also in mesh with the gear J is the gear B carried by the input shaft 203 and a gear E carried by the reverse shaft 208 and connectable to rotate therewith by a conventional multi-plate clutch W.

The reverse shaft 208 also carries a gear F which is connectable thereto to rotate therewith by a conventional multi-plate clutch V. The gear F is in mesh with the gear H carried by the main shaft.

In example illustrated in FIG. 6 the number of teeth on each gear is shown in FIG. 6 and the table below sets out which clutches are engaged to provide a desired one of the six available forward ratios and the four available reverse ratios.

These ratios are available on an output shaft 218 which is separate from but coaxial with the main shaft 212.

If desired the torque connector and lock up clutch may be connected, alternatively, to other kinds of gearbox such as another type of stepped gear change gear box or a constant velocity transmission (CVT) type gear box.

In a back hoe type vehicle the output shaft 218 is connected to the rear wheels whilst the four wheel drive output shaft 216 is connected to the front wheels. In a telescopic handler type vehicle the output shaft 218 is connected to the front wheels and the four wheel drive output shaft 216 is connected to the rear wheels.

In a back hoe type excavator the front wheels are smaller than the rear wheels and this is accommodated by the ratio between gears K and M and the 23–44 ratio option for the gears L and O. In a telescopic handler the front and rear wheels have the same diameter, then whilst and alternative between gears L and O option is chosen this does not compensate for the ratio of the gears K and M and this is accommodated by providing the differentials on the front and rear axles of the telescopic handler with appropriate ratios.

Figure 7:
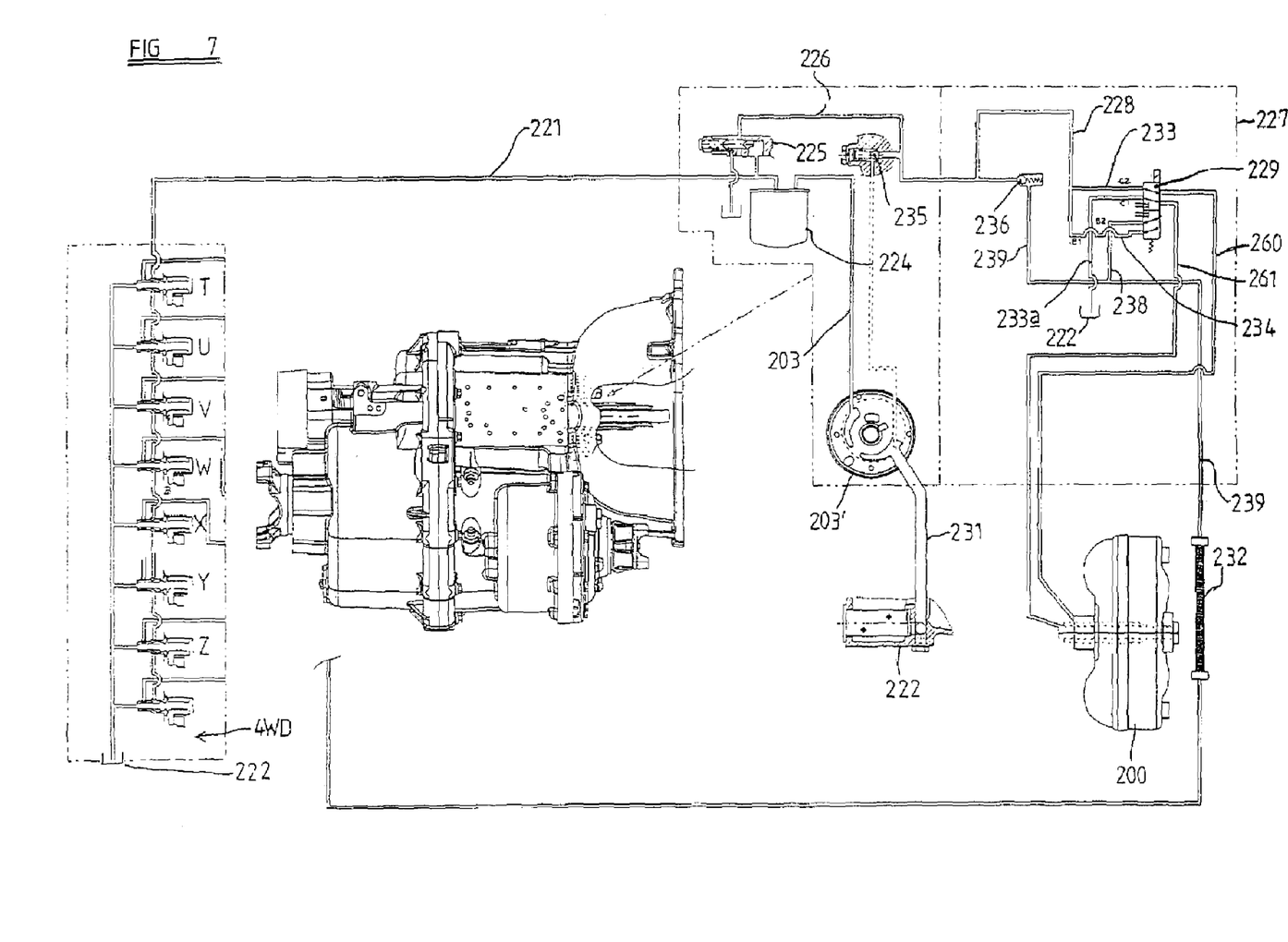
FIG. 7 is a hydraulic circuit diagram of a part of the transmission which is provided in the vehicles of FIG. 1 of 5.

The clutches described hereinbefore are operated in conventional manner by fluid supplied thereto on appropriate lines extending from solenoid valves marked T–Z and 4WD in FIG. 7. The valves are supplied with fluid under pressure on a line 221 whilst oil is returned to a reservoir 222. Oil is pressurized by the pump 203' shown in FIG. 7. Oil is fed by the pump 203' on line 203 to an oil filter 224 and is then fed on the line 221 to the solenoid valves and via a pressure maintaining valve 225 and line 226 to a reverse flow module 227 hereinbefore to be described.

Figure 8A:
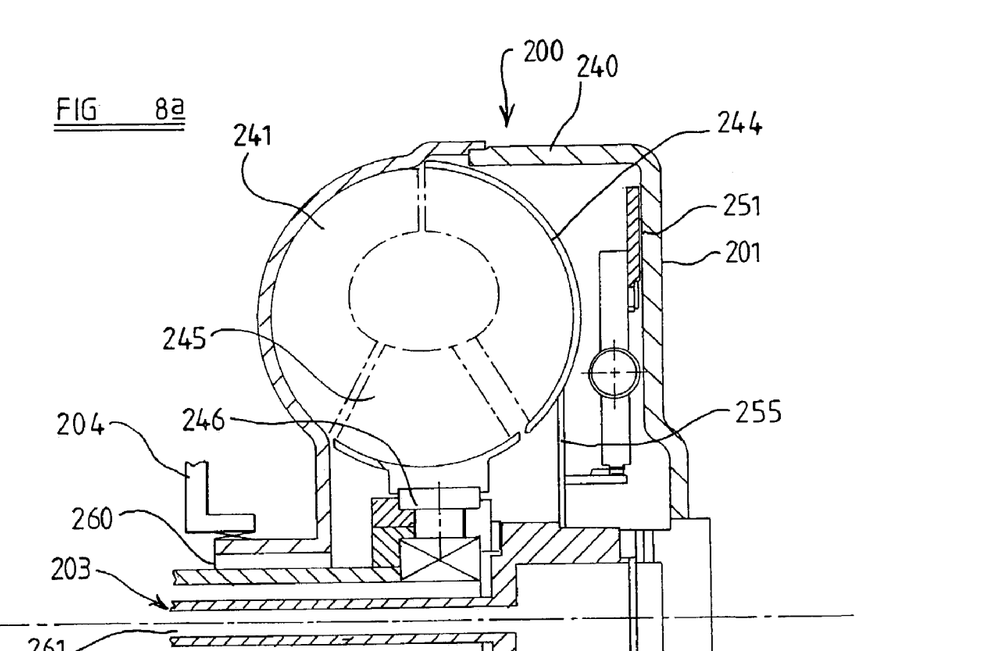
FIG. 8a is an illustration, to an enlarged scale, of half a torque converter of the transmission shown in FIG. 6 in a condition in which a lock up clutch is operative.
Figure 8B:
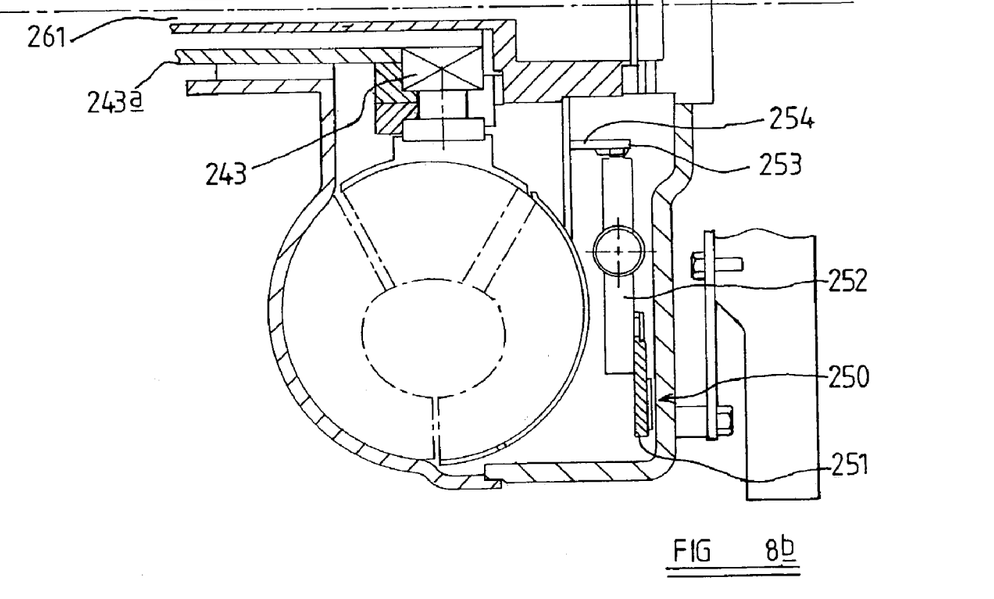
FIG. 8b is an illustration similar to that of FIG. 8a but showing a half of the torque converter in a condition in which the lock up clutch is inoperative.

The torque converter 200 is of generally conventional form consisting of the usual hollow two part shell 240. The half of the shell which is more remote from the engine comprises a vaned impeller 241. As shown seen in FIG. 8 the torque converter is supported by the shell 240 being bolted to the engine via a flexi plate and a bearing on the impeller extension. The shell 240 is driven by a driving assembly connected to the input 201 and thence to the engine of the vehicle. In the other half of the shell 240 i.e. that which is nearer to the engine, there is mounted a vaned turbine 244 connected to one end of the output shaft 203. The impeller 241 and the turbine 244 comprise torque transmission elements through which the torque is transmitted. Disposed at the inner periphery of the path of the fluid within the converter is a vaned reaction element 245 which is held against rotation under torque conversion conditions by a conventional overrunning device 246 such as a spray type one way clutch or a wheel. The device 246 is supplied by a hollow shaft 243 and carried as a bearing 243.

A lock-up clutch 250 is functionally arranged between the shell 240 and a member 251 which is connected to the output 203 whereby in an operative condition of the clutch the output of the engine can be directly connected to the shaft 203 without torque conversion whilst in an operative condition, the output of the engine drives the turbine through the impeller with torque conversion.

The lock up clutch 250 comprises a friction plate 251 carried on a disc 252 which is connected by a keyway 253 provided on a cylindrical member 254 fixed to an intermediate member 255 carried by the turbine 244.

Movement of the lock up clutch to its operative condition occurs as a result of flow of fluid through the torque converter in a reverse direction to normal. More particularly the line 226 extending to the reverse flow module 227 is connected to a two port-pressure relief valve 235, comprising a ball, or spool, spring loaded against a port in the hydraulic line 226. As pressure rises in the line 226 the force acting on the ball or spool overcomes a spring force allowing some fluid to escape to a second port which is connected directly or indirectly to a sump 222 a or to a low pressure line 231 which connects the sump 222 to the pump 203'. The valve 235 is provided to prevent excessive pressure resulting from combinations of high flow and/or low temperature damaging the torque converter during unlocked converter operation. In the reverse flow module 227 a valve of similar type is provided as shown at 236 but this is set at a pressure at which the torque converter is to be maintained during lock up operation. It is this internal pressure that holds the friction material 251 against the converter shell 240 as hereinafter to be described. The friction from this contact locks the torque converter. It is necessary that the pressure setting of the valve 236 is lower than that of the valve 235.

Flow of hydraulic fluid past the valve 236, passes on a line 239 to a cooler 232 and also provides lubrication of the gearbox.

As can be the best seen from FIG. 8a, the flow through the torque converter in the locked condition is minimal as the path to the sump 222 is effectively blocked by the friction plate.

The oil provides engaging pressure to the lock up clutch whilst the flow is directed past the valve 236 to lubricate the gear box.

The line 226 is connected by a line 228 to a lock up valve 229 which is a six port changeover type valve which controls the flow through the converter as can be seen in FIGS. 8a and 8b. Flow to the valve 229 from the line 228 is provided either on line 233 or 234. Further, a line 233a extends to the sump 222 whilst a line 238 is connected to the output line 239 of the valve 236.

When the solenoid is not energized and the valve is in a first position the lines 233 and 233a respectively are connected to lines 260 and 261 or, when the solenoid is energized and the valve is in a second position the lines 238 and 234 respectively are connected to lines 260 and 261.

The line 260 is directed to the torque converter so as to change it from the unlocked or inoperative condition to the locked or operative condition as shown in FIG. 8a whilst the line 261 changes the torque converter from the locked or operative condition to the unlocked or inoperative condition as in FIG. 8b. As best shown in FIG. 8a oil supplied on line 260 from line 233 enters the torque converter as illustrated in FIG. 8 and applies pressure between the friction plate 251 and the casing 201 to lock the drive between the input and the output. Such oil as leaks past the plate 251 drains to the sump 222.

When it is desired to change the torque converter from the locked condition to the unlocked condition fluid is supplied on the line 261 from line 234 to act on the opposite side of the friction plate 251 to allow oil to pass between the friction plate 251 and the casing 201 thereby allowing the torque converter to slip. Oil which passes between the friction plate and the casing in this way leaves on line 260 and is directed by the valve 229 onto line 238 to join the circulation through the oil cooler 232 to lubricate the gear box, excluding the four wheel drive which is separately lubricated and then it drains to the sump 222.

Thus, when the lock up clutch is engaged fluid flows on line 228 and 233 via the valve 229 into the passage 260 to apply pressure to the friction plate whilst such oil as leaks past the friction plate and the rotor will leave the torque converter on line 261 and pass on line 233a to the sump 222. Conversely when the lock up clutch is disengaged fluid passes on line 228 and line 234 and is passed by a valve 229 to line 261 where pressure acts between the rotor and the friction plate to disengage the lock up clutch and then fluid leaves the torque converter on line 260 and is passed by the valve 229 to line 238 and thence via line 239 to the oil cooler 232 and hence to lubricate the gear box (excluding the four wheel drive shaft).

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

We claim:
1. A vehicle comprising:
a body having an engine mounted therein, said body having a boom carried thereon, said boom being pivotally movable upwardly and downwardly;
a ground engaging means drivedly connected to said engine, said ground engaging means for allowing said body to move along a surface of the earth;
a material handling implement carried by said boom;
a transmission cooperative with said engine and said ground engaging means, said transmission having a torque converter and a change speed gearbox, said torque converter having an input shaft drivably connected to said engine, said input shaft connected to an impeller, said torque converter having an output shaft drivably connected to said ground engaging means and connected to a turbine, said turbine and said impeller having a fluid path therebetween, said transmission having a reactor member and a fluid in said fluid path, said reactor member transmitting torque hydro-kinetically between said impeller and said turbine with said fluid, said transmission having a lock-up clutch means having an operative condition connecting said torque converter for direct drive without torque conversion between said input shaft and said output shaft, said lock-up clutch means having an inoperative condition permitting drive through said torque converter with torque conversion; and
a fluid circuit having an inlet conduit to said torque converter and an exit conduit from said torque converter, said fluid circuit having a fluid therein which enters said torque converter by said inlet conduit and leaves said torque converter by said exit conduit during said inoperative condition of said lock-up clutch means, said fluid in said fluid circuit leaving said torque converter through said inlet conduit and entering said torque converter during said operative condition of said lock-up clutch.

2. The vehicle of claim 1, further comprising:
an overrun means connected to said reactor member for holding said reactor member against rotation during torque conversion.

3. The vehicle of claim 1, further comprising:
a valve means cooperative with said fluid circuit for controlling flow of the fluid therein, said valve means movable between a first position feeding fluid from a supply to an inlet conduit and a second position feeding fluid from said supply to said exit conduit.

4. The vehicle of claim 3, said valve means having a valve member, the vehicle further comprising:
a solenoid means connected to said valve member, said solenoid means for moving said valve member in one direction between said first and second positions.

5. The vehicle of claim 4, wherein said solenoid means is energized by an electronic control system.

6. The vehicle of claim 1, further comprising:
a king post assembly connected to said body, said boom comprising a main boom having a lower end pivotally connected to said king post assembly for movement upwardly and downwardly in a vertical plane, said boom further comprising a dipper arm pivotally connected at an outer end of said main boom and moveable in a vertical plane, said dipper arm carrying said material handling implement, said boom further comprising a hydraulic ram means for pivoting said main boom relative to said king post assembly and for raising and lowering said main boom in said vertical plane, said hydraulic ram means for pivoting said dipper arm in the vertical plane relative to said main boom, said hydraulic ram means for pivoting the material handling implement in a vertical plane relative to said dipper arm, said king post assembly capable of pivotal movement about a vertical axis such that said main boom can be rotated or slewed from one side to another side of said body.

7. The vehicle of claim 1, said boom comprising:
a loader arm assembly having a first end mounted on a support part of said body for rotation about a first horizontal axis, said loader arm assembly having said material handling implement at a second end thereof for rotation about a second horizontal axis; and
a fluid operated means connected to said loader arm for rotating said loader arm assembly about said first horizontal axis and for rotating said material handling implement relative to said loader arm assembly about said second horizontal axis.

8. The vehicle of claim 1, said boom comprising a plurality of boom sections telescopically connected together, said plurality of boom sections being movable longitudinally relative to each other, one end of said plurality of boom sections being pivotally mounted to a rear of said body, an opposite end of said plurality of boom sections carrying said material handling implement.

* * * * *